US006748179B2

(12) United States Patent
Lange et al.

(10) Patent No.: US 6,748,179 B2
(45) Date of Patent: Jun. 8, 2004

(54) WDM CHANNEL MONITORING SYSTEM AND METHOD

(75) Inventors: Michael Lange, Palm Bay, FL (US); Edward Tegge, Palm Bay, FL (US); John DeSalvo, Satellite Beach, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/801,103

(22) Filed: Mar. 7, 2001

(65) Prior Publication Data

US 2002/0126348 A1 Sep. 12, 2002

(51) Int. Cl.[7] .......................... H04B 10/00; H04B 10/16
(52) U.S. Cl. .......................................... 398/177; 398/33
(58) Field of Search ................................ 359/189, 110; 385/48; 356/73.1

(56) References Cited

U.S. PATENT DOCUMENTS

| | | | | |
|---|---|---|---|---|
| 4,737,970 A | * | 4/1988 | Viola et al. | 359/158 |
| 5,022,042 A | | 6/1991 | Bradley | 372/75 |
| 5,455,703 A | * | 10/1995 | Duncan et al. | 359/152 |
| 5,675,432 A | | 10/1997 | Kosaka | 359/341 |
| 5,701,194 A | | 12/1997 | Meli et al. | 359/341 |
| 5,745,283 A | | 4/1998 | Inagaki et al. | 359/341 |
| 5,761,234 A | | 6/1998 | Craig et al. | 372/75 |
| 5,801,858 A | | 9/1998 | Roberts et al. | 359/114 |
| 5,844,706 A | | 12/1998 | Kohn et al. | 359/179 |
| 5,847,862 A | | 12/1998 | Chraplyvy et al. | 359/337 |
| 5,943,147 A | * | 8/1999 | Vanoli et al. | 359/110 |
| 5,986,782 A | * | 11/1999 | Alexander et al. | 359/110 |
| 6,078,414 A | * | 6/2000 | Iwano | 359/110 |
| 6,172,782 B1 | * | 1/2001 | Kobayashi | 359/110 |
| 6,204,945 B1 | * | 3/2001 | Iwata et al. | 359/110 |
| 6,239,889 B1 | * | 5/2001 | Harley et al. | 359/110 |
| 6,407,376 B1 | * | 6/2002 | Korn et al. | 250/227.23 |

* cited by examiner

*Primary Examiner*—Jason Chan
*Assistant Examiner*—Agustin Bello
(74) *Attorney, Agent, or Firm*—Allen, Dyer, Doppelt, Milbrath & Gilchrist, P.A.

(57) ABSTRACT

The system and method of the present invention is operative to monitor the performance of an optical communications channel. An optical splitter splits a wavelength division multiplexed (WDM) optical communications signal into a low power WDM signal onto a back-up path, where a tunable filter sweeps the optical communications channels, while a monitoring circuit monitors the optical communications channels for performance. Optical power can be stored and subsequently displayed, providing an optical spectrum analysis of the signal.

31 Claims, 5 Drawing Sheets

WDM CHANNEL MONITORING SYSTEM AND METHOD

FIELD OF THE INVENTION

This invention relates to the field of optical communication systems, and more particularly, this invention relates to an optical communication system using wavelength division multiplexed (WDM) optical communication signals and having back-up receiver capability.

BACKGROUND OF THE INVENTION

Wavelength division multiplexing (WDM) is commonly used in optical communication systems for increasing the bandwidth of a fiber optic telecommunications link, without increasing the speed of associated electronics. In many prior art optical communication techniques, the bandwidth of a single channel (or wavelength fiber optic telecommunication link) has been limited primarily by the high-speed electronics required at the transmitter and receiver. By using wavelength division multiplexing at a telecommunications system receiver, the optical channels that receive the optical communication signals are separated, or demultiplexed, and sent to individual receivers, which vary in their rate of data receipt. One example of a receiver is a 2.488 Gb/S receiver.

The number of individual receivers used in the optical communications system can vary. These communication receivers connect into a back plane of existing telecommunications equipment. For example, a telecommunications rack could include one or more receivers, such as 8 or 16 receivers, each mounted on a board within the telecommunications rack. When optical components fail, it is necessary to determine the channel that is being used by the failed optical component or particular receiver.

In the past, telecommunication links have rerouted signals on the electrical switching level when any optical components failed, thus loading another path onto the network. It would be more advantageous to re-route an optical communication signal on a particular wavelength channel at the receiver terminal, in the case of a receiver failure or other optical component failure, and not consume network bandwidth as in prior art techniques. This would allow receiver maintenance at any time without increasing downtime or network re-routing.

It would also be desirable to monitor a channel and allow continuous sweeping of the optical communications channels. For example, if a channel showed any signs of weakening or failure, it would be advantageous to identify the source of the problem so that corrective measures could be sought. Thus, there is a need for greater channel monitoring capability. Although there are some channel monitoring devices that use single mode fiber, such as one commercially available system manufactured under the trade designation "Spectra SPAN," it has no capability as a back-up signal receiver.

SUMMARY OF THE INVENTION

The present invention is advantageous and allows the re-routing of optical communication signals at the receiver terminal, in case of receiver failure or other optical component failure. The system also does not consume network bandwidth as in past practices, where signals have been re-routed on the electrical switching level when optical components failed. Thus, in the present invention, another path is not loaded onto the network and bandwidth is not consumed. The present invention also allows receiver maintenance at any time, without down time or network re-routing.

The present invention can also function as a channel monitor, allowing continuous sweeping of optical communication channels for quality and performance. When a channel shows signs of weakening or failure, identification of the source of the problem can be triggered, and corrective measures sought. If any one of the dedicated telecommunications system receivers fail on any given wavelength, the back-up receiver system of the present invention can be tuned to that particular wavelength and take over the link, while repairs are being conducted.

The present invention can also be used as a tracking filter for systems that use a tunable laser for laser transmitters that fail. The receiver can track to a new wavelength location where a tunable transmitter has been positioned to account for a failing, or a failed laser transmitter. The present invention can also be used as a tunable receiver for systems/locations requiring tunability, such as add/drop nodes on a fiber.

In accordance with the present invention, the system monitors the performance of an optical communications channel and includes an optical splitter positioned along an optical communications path for receiving a wavelength division multiplexed (WDM) optical communications signal on the optical communications path. This signal is split into a low power WDM signal onto a back-up path where a tunable filter receives the low power WDM optical signal and sweeps the optical communications channels. A monitoring circuit is operatively connected to the tunable filter and monitors the optical communications channels for performance. The tunable filter is swept and the optical power is stored and subsequently displayed, providing an optical spectrum analysis of the signal. The optical amplifier can receive the low power WDM signal and amplify same after splitting from the optical communications signal.

In another aspect of the present invention, the amplifier includes an injection laser diode and a current source control loop circuit connected to the injection laser diode that establishes a fixed current through the injection laser diode. A voltage switcher circuit is connected to the injection laser diode and current source control loop circuit. The tunable filter can comprise a Fabry Perot filter. The controller can be operatively connected to the tunable filter in a controller feedback path for controlling the selection of desired wavelengths corresponding to the optical communications channels.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and allows the re-routing of optical communication signals at the receiver terminal, in case of receiver failure or other optical component failure. The system also does not consume network bandwidth as in past practices, where signals have been re-routed on the electrical switching level when optical components failed. Thus, in the present invention, another path is not loaded onto the network and bandwidth is not consumed. The present invention also allows receiver maintenance at any time, without down time or network re-routing.

The present invention can also function as a channel monitor, allowing continuous sweeping of optical communication channels for quality and performance. When a channel shows signs of weakening or failure, identification of the source of the problem can be triggered, and corrective measures sought. If any one of the dedicated telecommunications system receivers fail on any given wavelength, the back-up receiver system of the present invention can be tuned to that particular wavelength and take over the link, while repairs are being conducted.

The present invention can also be used as a tracking filter for systems that use a tunable laser for laser transmitters that fail. The receiver can track to a new wavelength location where a tunable transmitter has been positioned to account for a failing, or a failed laser transmitter. The present invention can also be used as a tunable receiver for systems/locations requiring tunability, such as add/drop nodes on a fiber.

Figure 1:
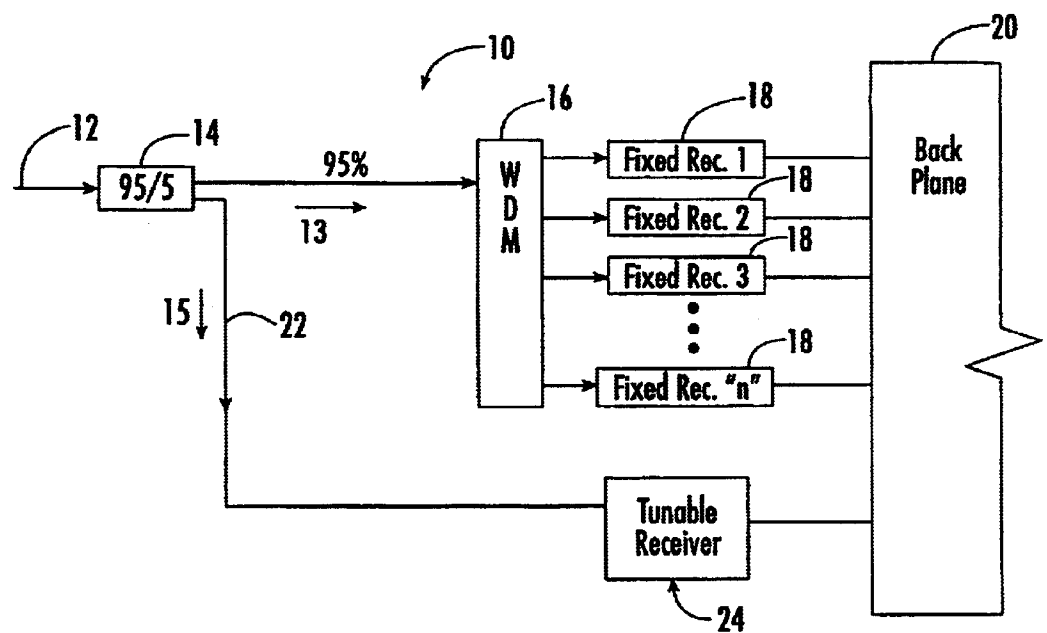
FIG. 1 is a block diagram of a wavelength division multiplexed optical communications system having a plurality of fixed receivers and a tunable optical receiver of the present invention positioned on the back-up path, which are connected to the back plane of existing telecommunications equipment.

FIG. 1 illustrates an optical communication system at 10, where a wavelength division multiplexed (WDM) optical communications signal 12 is transmitted along optical communications path 13. The optical communications signal 12 passes through an optical splitter 14, positioned along the path 13, which splits off about 5%, as a non-limiting example, of the light power comprising the optical communications signal and as a full spectrum of that signal into a back-up path 15. About 95% of the wavelength division multiplexed optical communication signal passing along the optical communications path continues into a WDM circuit 16, which includes a demultiplexer for dividing the WDM optical communications signal into separate optical communication signals of different wavelengths λ1 through λn, and into respective fixed (dedicated) receivers 18, such as the illustrated fixed receiver 1, fixed receiver 2, . . . fixed receiver n. The fixed receivers 18 connect into the back plane 20 of existing telecommunications equipment, as known to those skilled in the art.

The optical signal 22 is formed from the split-off portion of the light and comprises about 5% of the original power of the WDM optical communications signal 12. It is a low power WDM optical signal having the full spectrum of the light from the original WDM optical communications signal 12. The tunable, optically amplified back-up receiver 24 of the present invention receives the optical signal 22 and selects an optical signal of desired wavelength for the appropriate channel to be backed-up (λ1 through λn), and converts this optical signal of desired wavelength into an electrical communications signal to be fed into the back plane 20. The receiver 24 of the present invention operates as a back-up receiver in case one of the fixed receivers 18 is inoperable, or the optical components that carry an optical signal of a particular wavelength are inoperable.

Figure 2:
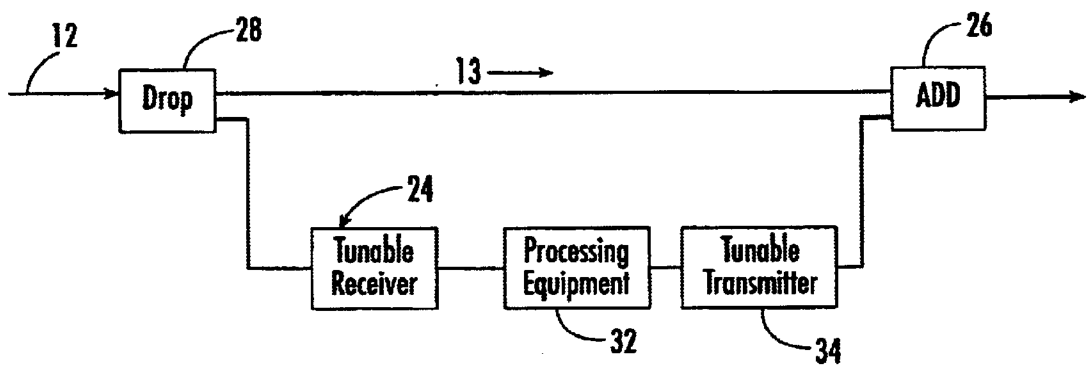
FIG. 2 is another block diagram showing add/drop nodes, where a tunable receiver, processing equipment, and tunable transmitter are used.

FIG. 2 illustrates how the tunable, optically amplified back-up receiver 24 of the present invention can be used in a system or location requiring tunability, such as for respective add/drop nodes 26,28 on a telecommunications fiber. The tunable receiver 24 is operatively connected to telecommunications processing equipment 32 and a tunable transmitter 34. The optical signal of selected wavelength can be dropped and received in the tunable receiver 24. It is converted by the receiver 24 into the appropriate electrical communications signal, which is then processed by appropriate signal processing circuitry, amplifier circuitry, regeneration circuitry and other circuitry known to those skilled in the art. Once processed, the electrical communications signal is passed to the tunable transmitter 34, which converts the electrical communications signal that had been processed into an optical signal. It is then added to the main optical communications signal 12 passing along the main optical communications path 13.

Figure 3:
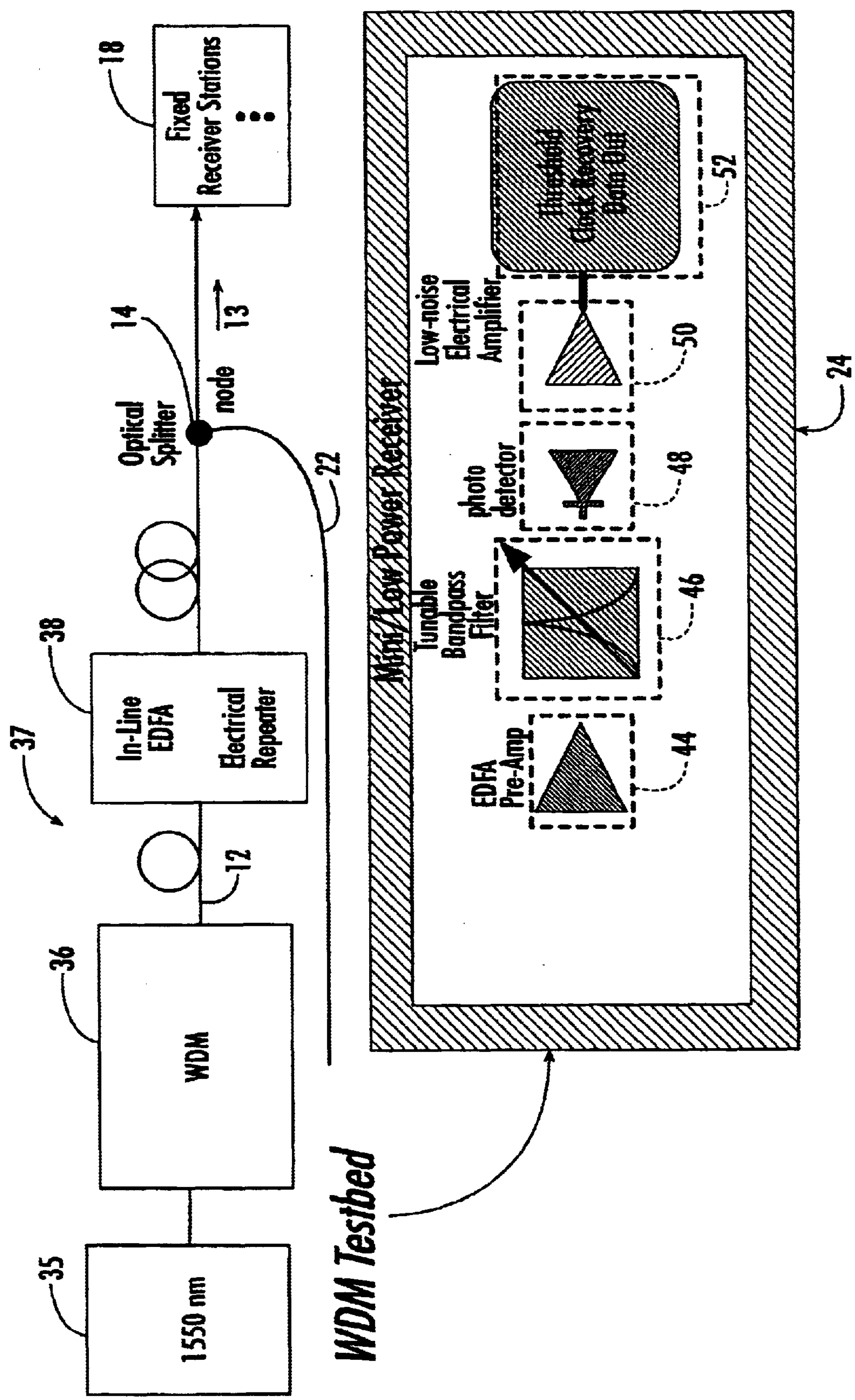
FIG. 3 is another block diagram showing an example of a wavelength division multiplexed optical communications system having the optically amplified back-up receiver of the present invention.

FIG. 3 illustrates a high level block diagram of the optical communications system 10 where optical communications signals 35 of about 1550 nanometers are wavelength division multiplexed 36 into optical communications signal 12 at about 155 Mb/S to about 4 Gb/S in a high bandwidth data distribution system 37, including appropriate in-line, erbium doped fiber amplifiers 38 acting as optical repeaters. The amplified optical communications signal 12 is passed to the dedicated optical receivers 18 along the main optical communications path 13.

The optical splitter 14 forms a node that allows the full spectrum of the wavelength division multiplexed optical communications signal to be split off (about 5% of its power) and passed into back-up path 15 as an optical signal 22 and to the tunable mini/low power optically amplified back-up receiver 24 of the present invention.

The tunable optically amplified back-up receiver 24 of the present invention includes an erbium doped fiber amplifier 44 (EDFA) acting as a preamplifier. This permits amplification of the low power optical signal before passing into the tunable bandpass filter 46, which selects one of the desired wavelengths, λ1 through λn. A photodetector, which in the present embodiment is a PIN diode 48, but also can be an Avalanche Photo Diode (APD), converts the amplified and optical signal of desired wavelength into an electrical communications signal and passes that electrical communications signal into a low-noise electrical amplifier 50 and into the clock and data recovery circuit 52.

Figure 4:
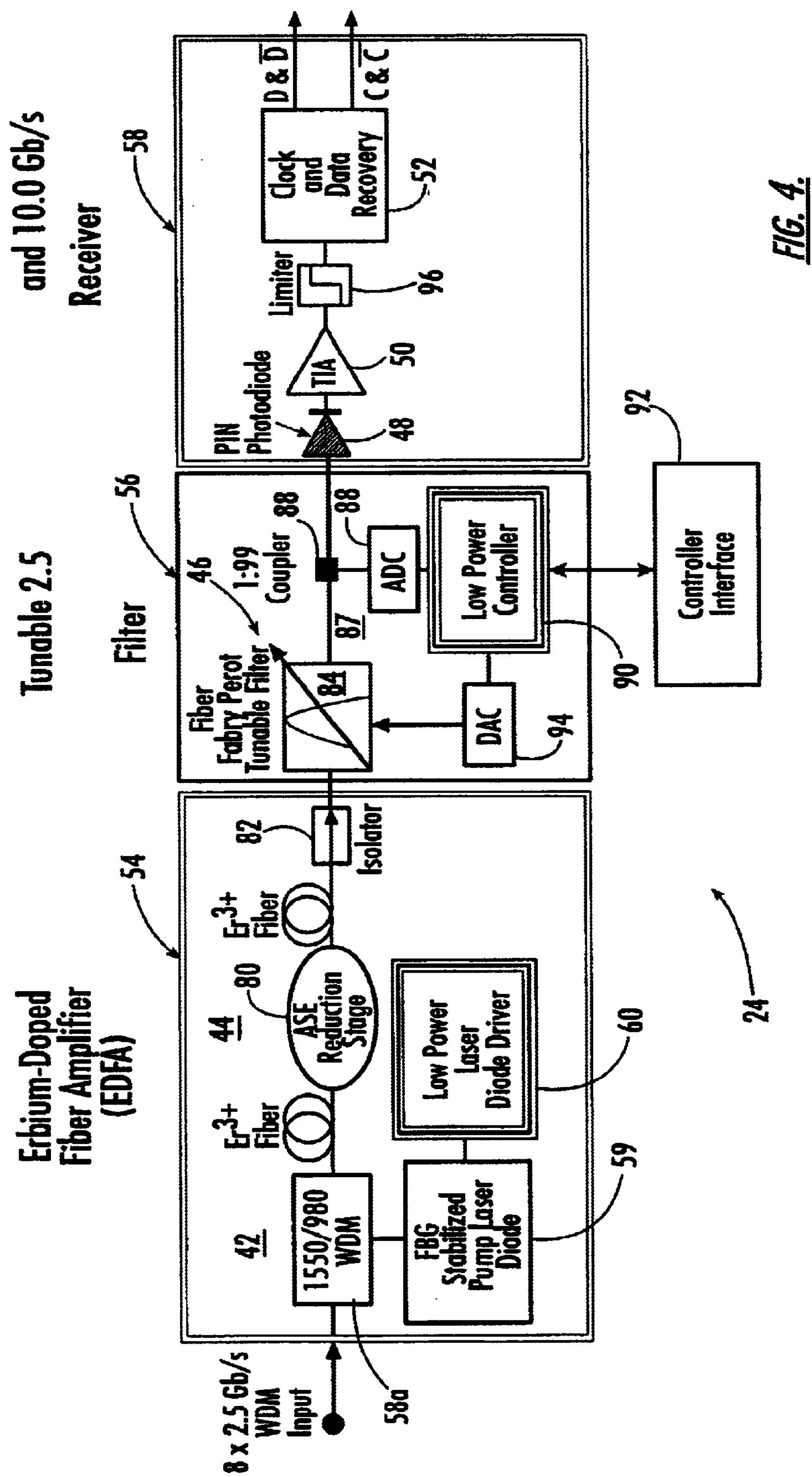
FIG. 4 is another block diagram similar to FIG. 3, but showing in greater detail the optically amplified back-up receiver of the present invention.

FIG. 4 illustrates greater details of the tunable optically amplified back-up receiver 24 of the present invention, and illustrating three main sections as an amplifier section 54, having the erbium-doped fiber amplifier (EDFA) 44 as shown in FIG. 3, a tunable filter section 56, and the receiver section 58 operable as a detector used at different wavelengths. The detector electronics is selected to support typical data rates, including 2.5 and 10.0 Gb/S.

Although the ranges of data and number of used channels are set forth as non-limiting examples, it should be understood that the present invention is advantageously used with different wavelengths and different number of channels. As illustrated, the WDM optical communications signal, such as 2.5 Gb/S WDM signal input, passes into a 1550/980 WDM input circuit 58*a* that is operable with a Fiber Bragg Grating Stabilized Pump Laser Diode circuit 59 and a low power laser diode driver circuit 60.

Figure 6:
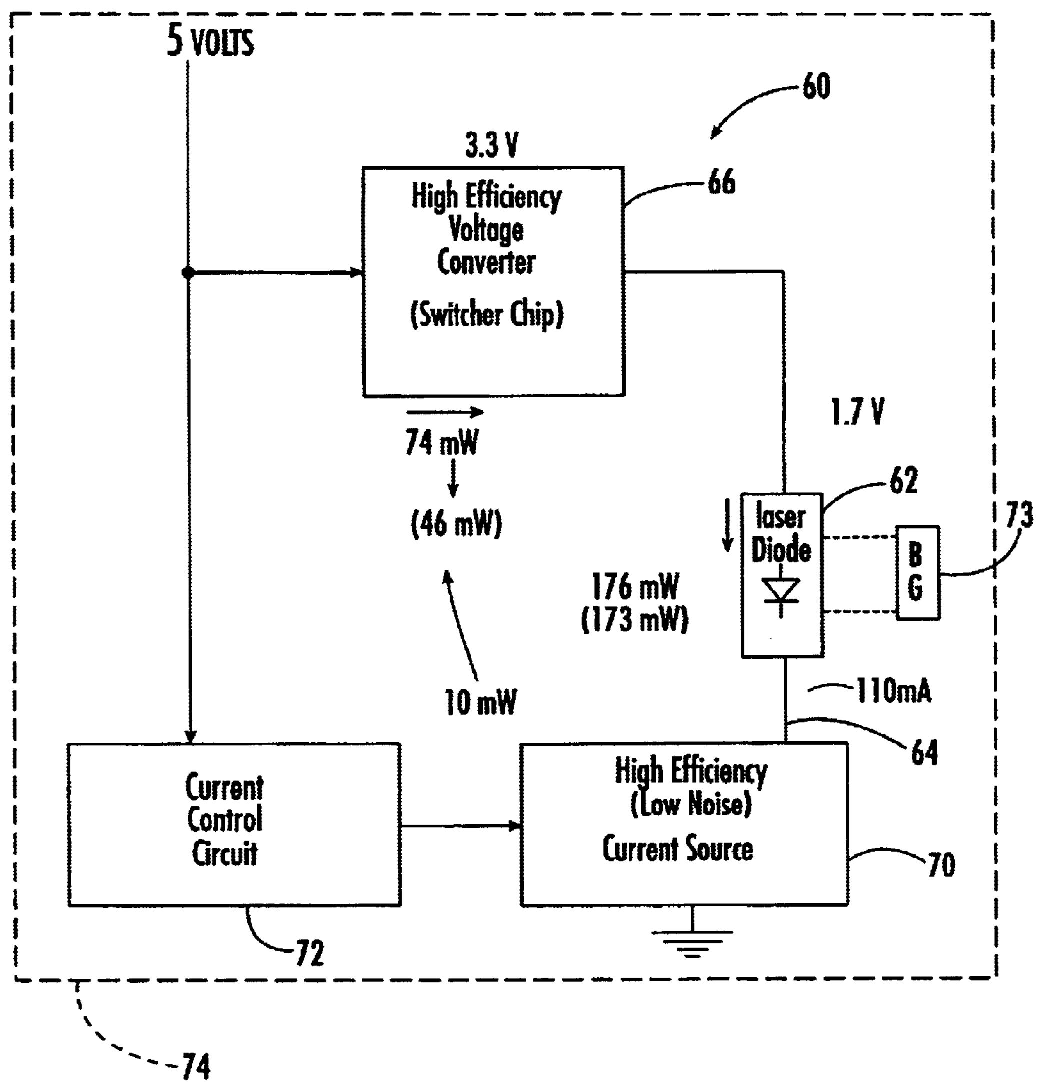
FIG. 6 is a block diagram of a low power laser diode driver used as part of the amplifier section of the optically amplified back-up receiver of the present invention.

Although different laser diode drivers can be used in accordance with the present invention, in one aspect of the present invention, the low power laser diode driver is illustrated in FIG. 6, and can be used with the tunable receiver of the present invention. This low power laser driver circuit 60 can be used for driving the optical preamplifier and receiver assembly shown in FIG. 4.

A five volt supply voltage input is standard with many electronic circuits. The laser driver circuit 60 includes an injection laser diode 62 that is, in one aspect of the present invention, a high quantum efficiency injection laser diode (HQEILD). A current source control loop circuit 64 is connected to the injection laser diode 62 and establishes a fixed current through the injection laser diode. This current source control loop circuit 64 has a voltage switcher circuit chip 66 connected to the injection laser diode, within the current source control loop circuit, and is adapted to receive the fixed supply voltage of five volts and convert inductively the supply voltage down to a forward voltage, to bias the laser injection diode and produce an optical output having minimized power losses.

This voltage switcher circuit chip 66 is monolithically formed as a single circuit chip, and is used as a high efficiency voltage converter as shown in FIG. 6.

The current source control loop circuit 64 includes the high efficiency current source 70, acting as a low noise current source and the current control circuit 72. These circuits are all contained within one housing, and in one aspect, on a printed circuit card assembly 74 that includes the receiver components, including the preamplifier, tunable bandpass filter circuit and optical-to-electrical conversion circuit.

The schematic circuit diagram shows various power and voltage, as well as current parameters. In this non-limiting example, at 260 milliwatts and at five volts DC, there is a 35 decibel optical gain, with one channel as a design goal. There could be a 266 milliwatt DC for eight channels, and 220 milliwatts DC achieved. The Bragg grating 73 is operatively connected to the injection laser diode 62, and is operative by principles known to those skilled in the art. The Bragg grating 73 is configured for receiving the optical output and stabilizing the optical wavelength.

As shown in FIG. 4, an ASE Reduction Stage circuit 80 works in conjunction with an isolator circuit 82 using amplification techniques known to those skilled in the art. The tunable filter section 56 includes the tunable filter 46, which in one aspect of the present invention, is a fiber Fabry Perot tunable filter 84. A 1:99 coupler 88, as a non-limiting example, allows a portion of the optical signal to be converted by a photodetector to an electrical current, and pass into a feedback control circuit 87, including an analog/digital converter 88, a low power controller 90, which is operative with a controller interface 92 and associated electronics, and digital/analog converter 94, for converting digitally processed control signals back to analog control signals and selectively tuning the fiber Fabry Perot tunable filter. This circuitry also allows an optical spectrum to be detected and stored.

The optical communications signal, once tuned to the desired wavelength and frequency, passes into the receiver section 58 that includes an optical-to-electrical conversion circuit having the detector, i.e, the PIN photodiode 48, followed by the low noise electrical amplifier 50, which in one aspect of the invention, is a preferred transimpedance amplifier and amplifies the converted electrical communication signal received from PIN photodiode 48. An electronic limiter circuit 96 receives the electrical communications signal and works in conjunction with a clock and data recovery circuit 52. This circuit allows data recovery and reshaping of electrical communication signals. A clock recovery circuit portion of circuit 52 allows recovery of clock signals and retiming of electrical communication signals by techniques known to those skilled in the art.

The data is output to the back plane 20 as shown in FIG. 1. In the embodiment shown in FIG. 2, the signal is sent to the processing equipment 32, and tunable transmitter 34, which then passes the signal back onto the main optical communication path 13.

In one non-limiting example of the present invention, the amplifier section 54 has about 230 mW with commercial off the shelf components (COTS) of about 2.0 watts, followed by the tunable filter section 56 operable at about 50 mW and COTS of about 6 W, and the receiver section 58 of about 680 mW and COTS of 1.5 W for a 2.5 Gb/S data rate.

The optical sensitivity at 2.5 Gb/S can be less than about −40 dBm at $1\times10^{-10}$ BER (bit error rate) with a total one channel power consumption of about 960 mW. For a non-limiting example of eight channels, it is possible to use a fixed λ demultiplexer providing a total power consumption of about 5.7 W, corresponding to 710 mW/channel.

Figure 5:
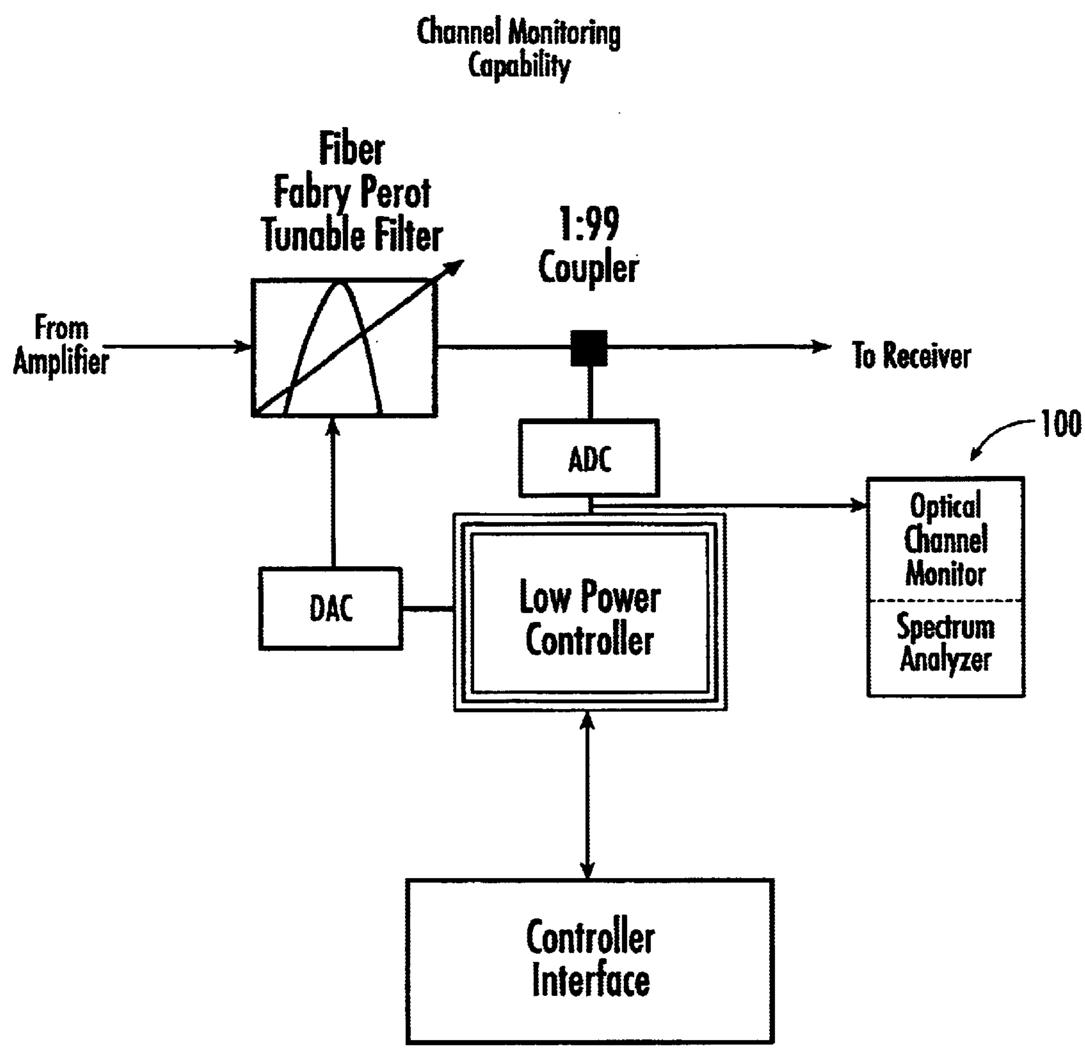
FIG. 5 is an enlarged block diagram of the tunable filter of the present invention having optical channel monitoring capability with a spectrum analyzer.

Referring now to FIG. 5, there is illustrated the tunable filter that has been modified to have channel monitoring or optical spectrum analysis capability in accordance with another aspect of the present invention. Between the analog/digital conversion circuit 88 and the low power controller 90, an optical channel monitoring circuit 100 is connected. The circuit 100 can include a spectrum analyzer, power meter or other associated electronic equipment for monitoring the channel. Thus, it is possible to select various wavelengths to monitor the operation of the particular channel and determine if there are errors in data transmission or other selected aspects. In this aspect of the invention, the tunable filter can be swept and the optical power stored in a processor memory, controller or other means known to those skilled in the art. This data can be processed and subsequently displayed, providing an optical spectrum analysis of the signal. The system can monitor averaged power and supervisory communications data. It also can perform an optical spectrum analysis of the signals.

It is also possible to use the optically amplified back-up receiver as a tracking filter for systems that use the tunable laser for laser transmitters that fail. The receiver can track to a new wavelength location where the tunable transmitter has been positioned to account for failing or failed laser transmitter.

This application is related to copending patent application entitled, "OPTICALLY AMPLIFIED BACK-UP RECEIVER," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for monitoring the performance of optical communications channels comprising:

- an optical splitter positioned along an optical communications path for receiving a wavelength division multiplexed (WDM) optical communications signal on the optical communications path and splitting a portion of the WDM optical communications signal into a low power WDM signal onto a back-up path;
- a tunable filter that receives the low power WDM optical signal and selects a desired optical wavelength;
- a controller operatively connected to said tunable filter for controlling the selection of a desired wavelength corresponding to an optical communications channel;
- an optical amplifier for receiving the low power WDM signal after splitting and amplifying same, said amplifier including an injection laser diode and circuit for converting inductively a supply voltage, to a forward biasing voltage to the injection laser diode, a current source control loop circuit connected to said injection laser diode that establishes a fixed current through the injection laser diode, and a voltage switcher circuit connected to said injection laser diode and current source control loop circuit; and
- an optical channel monitoring circuit operatively connected to said controller for monitoring the optical communications channels for performance by sweeping the tunable filter and processing data for optical signal analysis.

2. A system according to claim 1, wherein said tunable filter is swept and the optical power is stored, and subsequently displayed, providing an optical spectrum analysis of the signal.

3. A system according to claim 1, wherein the tunable filter further comprises a Fabry Perot filter.

4. A system according to claim 1, wherein said controller is operatively connected to said tunable filter in a controller feedback path for controlling the selection of desired wavelengths corresponding to the optical communications channels.

5. A system according to claim 4, wherein said optical channel monitoring circuit is operatively connected to said controller within said controller feedback path.

6. A system according to claim 5, wherein said controller feedback path further comprises analog/digital converter and optical coupler operatively connected to said tunable filter and controller and a digital/analog converter operatively connected to said controller and tunable filter, wherein said monitoring circuit is operatively connected to said controller and said analog/digital converter.

7. A system for monitoring the performance of optical communications channels comprising:

- an optical splitter positioned along an optical communications path for receiving a wavelength division multiplexed (WDM) optical communications signal on the optical communications path and splitting a portion of the WDM optical communications signal into a low power WDM signal onto a back-up path;
- a tunable filter that receives the low power WDM optical signal and selects a desired optical wavelength;
- a controller operatively connected to said tunable filter for controlling the selection of a desired wavelength corresponding to an optical communications channel;
- an optical channel monitoring circuit operatively connected to said controller for monitoring the optical communications channels for performance by sweeping the tunable filter and processing data for optical signal analysis;
- an optical amplifier for receiving the low power WDM signal after splitting and amplifying same, said amplifier including an injection laser diode and circuit for converting inductively a supply voltage to a forward biasing voltage for the injection laser diode, a current source control loop circuit connected to said injection laser diode that establishes a fixed current through the injection laser diode, and a voltage switcher circuit connected to said injection laser diode and current source control loop circuit; and
- a detector circuit for receiving the optical signal of desired wavelength and converting the optical signal into an electrical signal for amplification and subsequent signal processing.

8. A system according to claim 7, wherein said detector circuit comprises a PIN diode.

9. A system according to claim 7, wherein said detector circuit comprises an Avalanche Photodiode.

10. A system according to claim 7, wherein said detector circuit comprises an amplifier circuit.

11. A system according to claim 7, wherein said detector circuit comprises a limiter circuit for reshaping the detected optical signal.

12. A system according to claim 7, wherein said detector circuit comprises a data decision circuit and clock recovery circuit.

13. A system according to claim 7, wherein the tunable filter further comprises a Fabry Perot filter.

14. A system according to claim 7, wherein said controller is operatively connected to said tunable filter in a controller feedback path for controlling the selection of desired wavelengths corresponding to the optical communications channels.

15. A system according to claim 14, wherein said monitoring circuit is operatively connected to said controller within said controller feedback path.

16. A system according to claim 15, wherein said controller feedback path further comprises analog/digital converter and optical coupler operatively connected to said tunable filter and controller and a digital/analog converter operatively connected to said controller and tunable filter, wherein said monitoring circuit is operatively connected to said controller and said analog/digital converter.

17. A method of monitoring the performance of optical communications channels of a wavelength division multiplexed (WDM) optical communications signal comprising the steps of:

splitting off a percentage of the power from the WDM optical communications signal as an optical signal into a back-up path;

filtering the optical signal within a tunable filter and controllably selecting a desired wavelength by a controller and corresponding to a respective optical communications channel;

optically amplifying the low power WDM signal after splitting by converting inductively a supply voltage to a forward biasing voltage and supplying an injection laser diode, a current source control loop circuit connected to said injection laser diode that establishes a fixed current through the injection laser diode, and a voltage switcher circuit connected to the injection laser diode and current source control loop circuit; and monitoring the optical communications channels for performance in an optical channel monitoring circuit operatively connected to the controller by sweeping the tunable filter and processing data for optical signal analysis.

18. A method according to claim 17, wherein the percentage of split off from the WDM optical communications signal is about five percent.

19. A method according to claim 17, and further comprising the step of tuning the optical signal within a Fabry Perot tunable filter.

20. A method according to claim 17, and further comprising the step of controlling the selecting of desired wavelengths within the tunable filter via controller that is operatively connected to the tunable filter in a controller feedback path.

21. A method according to claim 17, wherein the step of monitoring comprises the steps of monitoring within a spectrum analyzer.

22. A method of monitoring the performance of optical communications channels of a wavelength optical communications signal comprising the steps of:

splitting off a percentage of the power from the WDM optical communications signal as an optical signal into a back-up path;

filtering the optical signal within a tunable filter and controllably selecting a desired wavelength by a controller and corresponding to a respective optical communications channel;

monitoring the optical communications channels for performance in an optical channel monitoring circuit operatively connected to the controller by sweeping the tunable filter and processing data for optical signal analysis;

optically amplifying the low power WDM signal after splitting by converting inductively a supply voltage to a forward biasing voltage and supplying an injection laser diode, a current source control loop circuit connected to said injection laser diode that establishes a fixed current through the injection laser diode, and a voltage switcher circuit connected to the injection laser diode and current source control loop circuit; and detecting and converting the optical signal of selected wavelength into an electrical communications signal for amplification and subsequent signal processing.

23. A method according to claim 22, wherein the percentage of split off from the WDM optical communications signal is about five percent.

24. A method according to claim 22, and further comprising the step of amplifying the detected optical signal.

25. A method according to claim 22, and further comprising the step of reshaping the detected optical signal within a limiter circuit.

26. A method according to claim 22, and further comprising the step of tuning the optical signal within a Fabry Perot tunable filter.

27. A method according to claim 22, and further comprising the step of controlling the selecting of desired wavelengths within the tunable filter via the controller that is operatively connected to the tunable filter in a controller feedback path.

28. A method according to claim 22, wherein the step of monitoring comprises the steps of monitoring within a spectrum analyzer.

29. A system for monitoring the performance of optical communications channels comprising:

an optical splitter positioned along an optical communications path for receiving a wavelength division multiplexed (WDM) optical communications signal on the optical communications path and splitting a portion of the WDM optical communications signal into a low power WDM signal onto a back-up path;

a tunable filter that receives the low power WDM optical signal and sweeps the optical communications channels;

a monitoring circuit operatively connected to said tunable filter for monitoring the optical communications channels for performance;

an optical amplifier for receiving the low power WDM signal and amplifying same after splitting from the optical communications signal, and comprising:

an injection laser diode;

a current source control loop circuit connected to said injection laser diode that establishes a fixed current through the injection laser diode; and a voltage switcher circuit connected to said injection laser diode and current source control loop circuit.

30. A system for monitoring the performance of optical communications channels comprising:

an optical splitter positioned along an optical communications path for receiving a wavelength division multiplexed (WDM) optical communications signal on the optical communications path and splitting a portion of the WDM optical communications signal into a low power WDM signal onto a back-up path;

a tunable filter that receives the low power WDM optical signal and sweeps the optical communications channels;

a controller operatively connected to said tunable filter in a controller feedback path for controlling the selection of desired wavelengths corresponding to the optical communications channels, said controller feedback path further comprising analog/digital converter and optical coupler operatively connected to said tunable filter and controller and a digital/analog converter operatively connected to said controller and tunable filter, wherein said monitoring circuit is operatively connected to said controller and said analog/digital converter; and a monitoring circuit operatively connected to said tunable filter and controller within said controller feedback path for monitoring the optical communications channels for performance.

31. A method of monitoring the performance of optical communications channels of a wavelength division multiplexed (WDM) optical communications signal comprising the steps of:

splitting off a percentage of the power from the WDM optical communications signal as an optical signal into a back-up path;

sweeping the optical communications channels by filtering the optical signal within a tunable filter and selecting desired wavelengths corresponding to respective optical communications channels;

monitoring the optical communications channels for performance;

amplifying the optical signal in an amplifier circuit comprising:

an injection laser diode;

a current source control loop circuit connected to said injection laser diode that establishes a fixed current through the injection laser diode; and a voltage switcher circuit connected to the injection laser diode and current source control loop circuit.

* * * * *